United States Patent
Roberts et al.

(10) Patent No.: US 6,659,269 B1
(45) Date of Patent: Dec. 9, 2003

(54) APPARATUS AND METHOD FOR TEMPORARY SUPPORT AND ISOLATION FOR A CONVEYOR BELT

(75) Inventors: Margaret A. Roberts, Morgantown, WV (US); John A. Phillips, Morgantown, WV (US); Michael B. McMillion, Morgantown, WV (US)

(73) Assignee: Consol Engergy Inc., Pittsburgh, PA (US)

( * ) Notice: Subject to any disclaimer, the term of this patent is extended or adjusted under 35 U.S.C. 154(b) by 87 days.

(21) Appl. No.: 09/626,586

(22) Filed: Jul. 27, 2000

Related U.S. Application Data (60) Provisional application No. 60/149,001, filed on Aug. 13, 1999.

(51) Int. Cl.[7] ............................................. B65B 15/60
(52) U.S. Cl. ................... 198/812; 198/594; 198/860.3
(58) Field of Search .................... 198/860.3, 860.4, 198/860.5, 303, 346, 812, 594, 588, 309

(56) References Cited

U.S. PATENT DOCUMENTS

| | | | |
|---|---|---|---|
| 2,724,515 A | | 11/1955 | Sheuchzer et al. |
| 3,071,179 A | | 1/1963 | Tourtellotte et al. |
| 3,228,516 A | * | 1/1966 | Sheehan ................. 198/139 |
| 3,433,348 A | | 3/1969 | Dawson |
| 4,195,726 A | | 4/1980 | Denny et al. |
| 4,474,287 A | * | 10/1984 | Thompson ............... 198/812 |
| 4,860,878 A | * | 8/1989 | Mraz et al. ............. 198/309 |
| 4,959,691 A | * | 9/1990 | Satoh ..................... 299/18 |
| 5,181,600 A | * | 1/1993 | Chappell et al. ........ 198/812 |
| 5,188,208 A | | 2/1993 | Hall |
| 5,246,102 A | | 9/1993 | Rappen et al. |
| 5,299,674 A | * | 4/1994 | Cusitar .................. 198/303 |
| 5,307,917 A | | 5/1994 | Hall |
| 5,348,130 A | | 9/1994 | Thomas |
| 5,366,068 A | | 11/1994 | Hall et al. |
| 5,718,325 A | * | 2/1998 | Doster et al. ........... 198/592 |
| 5,850,903 A | * | 12/1998 | Walters ................. 198/588 |
| 5,938,004 A | | 8/1999 | Roberts et al. |
| 5,979,642 A | * | 11/1999 | Hall et al. ............. 198/812 |
| 6,006,894 A | * | 12/1999 | Gibbs et al. ........... 198/588 |
| 6,095,320 A | * | 8/2000 | DeMong et al. ....... 198/812 |

FOREIGN PATENT DOCUMENTS

| | | | |
|---|---|---|---|
| AU | 687307 | | 7/1996 |
| GB | 2 322 348 | * | 8/1998 |

OTHER PUBLICATIONS

Article entitled, "CONSOL Coal Group Continues Progress in Greene County," published in "The Greene County Messenger", Feb. 26, 1999–Mar. 4, 1999.

"The McDonald Brune Paper", Minetime Congress 99, published Jun. 8–10, 1999 in Germany.

* cited by examiner

*Primary Examiner*—Jack Lavinder
*Assistant Examiner*—Bradley King
(74) *Attorney, Agent, or Firm*—Paul A. Beck & Associates, P.C.

(57) ABSTRACT

An apparatus and method for providing temporary support for and for isolation of an operating conveyor belt in order to insert permanent belt support structure. A top belt guard support and a bottom belt guard support are provided. A cantilever support structure that is connected to the leading ends of the top belt guard support and the bottom belt guard support that are primarily supported in a cantilever manner. The top belt guard support and the bottom belt guard support form a protected zone within a linear distance of the length of the top and bottom belt guard supports that enable installation of different types of permanent supports while the conveyor belt is operating.

8 Claims, 7 Drawing Sheets

Prior Art

APPARATUS AND METHOD FOR TEMPORARY SUPPORT AND ISOLATION FOR A CONVEYOR BELT

CROSS REFERENCE TO RELATED APPLICATION

This application claims the benefit of Provisional Application No. 60/149,001 filed on Aug. 13, 1999.

FIELD OF THE INVENTION

This invention relates to an apparatus and method for providing temporary support to an operating mining or bulk transfer conveyor belt in order to increase the effective length of the conveyor belt. The apparatus permits lengthening and supporting the conveyor belt without having to stop the conveyor belt to enable workers to assemble a permanent belt support structure. The apparatus is referred to as the Universal Structural Assembly Module ("USAM").

To maintain efficiency of many mining and other bulk material handling operations, it is often necessary to lengthen conveyor belts that transfer the mined material and move the loading point closer to an area of current mining activity. Additional support structure for the conveyor belt must be added to accommodate the increased length. Stopping the belt to insert additional permanent structural belt support components may interfere with the continuity of the mining activity. Inserting permanent structural belt support components under the weight of an unsupported belt may also be difficult, time consuming, and potentially hazardous. Different types or styles of structural supports require different installation procedures. Therefore it is desirable to have a safe temporary conveyor belt support structure that can be used without having to stop the conveyor belt and enable one to safely insert a permanent belt support structure of different types or styles while the belt is being temporarily supported.

The present invention provides a temporary support structure to eliminate the need for stopping the conveyor belt to install a permanent support structure of any typical style of belt support structure used for bulk material transfer including roof-hung structure. This is done by incorporating full metal guards around top and bottom conveyor belts to protect workers from the moving belts. The guards create a protected zone where a single section of permanent belt support structure can be safely assembled. Once a single section of permanent belt support structure is assembled in the protected zone, the apparatus is advanced a single increment, allowing the operating belt to contact the newly assembled section of permanent belt support structure, and creates a protected zone for assembly of another section of permanent belt support structure. The invention also provides a means to control and maintain proper alignment of the conveyor belt structure.

BACKGROUND OF THE INVENTION

The typical conveyor belt system has a belt connected to form a single, continuous loop like a rubber band. This loop is driven in circular fashion and material to be conveyed is loaded on the top portion of the loop or top belt. At the end of the loop, the belt turns over forming the bottom belt and the conveyed material falls off the belt. This loop is typically extended over a significant length (thousands of feet) and must be continuously supported. The belt support system may consist of incremental, structural members which are hand assembled. A single section of permanent belt support structure typically includes a right and left side rail, a belt support frame, a top roller, and a bottom roller. In underground applications, the belt frames are typically supported by either standing on the floor or hanging from the roof. Chains are typically used to support the hanging type belt frame. To extend a conveyor belt system, the belt loop must be lengthened and additional sections of permanent belt support structure must be assembled and installed. This assembly process requires shutting down the belt. The belt drive mechanism must be locked out to guarantee that the belt cannot move. This is required because the workers will be in contact with the belt during the permanent belt support structure assembly process and a moving belt presents a safety hazard.

A typical conveyor belt must be stopped to allow workers to assemble permanent belt support structure during or in preparation to advance the belt tail roller and extend the conveyor belt length. Assembling permanent belt support structure constitutes a time-consuming delay to the mining cycle. In order to avoid this time consuming delay the inventors have developed a belt support structure assembly module that protects workers from the conveyor belt.

There is no known device that provides a means for installation of conveyor belt support structure to support an increase of effective length of a belt without the need to stop the belt and that can be used on both floor-stand type and roof-hung type belt support structures.

SUMMARY OF INVENTION

The present invention provides an apparatus for providing temporary support to an operating conveyor belt in order to extend the effective length of the conveyor belt used in the mining industry without having to shut down the belt. The apparatus has a top belt guard support that has a leading end and a bottom belt guard support that has a leading end. There is a cantilever support structure connected to the leading ends of the top belt guard support and the bottom belt guard support in which the belt guard supports are primarily supported in a cantilevered manner. A protected zone is formed within a linear distance determined by a length of the top and bottom belt guard supports which enable installation of different types of permanent supports while the conveyor belt is operating and with the protection of the belt guard supports.

The invention additionally provides for a cantilever support structure that has a vertical member on which the top belt guard support is pivotally supported and the bottom belt guard support is pivotally supported. The cantilever support structure has an intermediate support in which the top belt guard support and the bottom belt guard support are supported vertically. The intermediate support is positioned between the vertical member and the protected zone. The intermediate support has a means to compensate for floor undulations and changes in vertical belt position.

The invention also provides for a cantilever support structure that has a means to advance to a next incremental position for permanent belt support structure assembly.

The invention additionally provides for an apparatus that has a means for maintaining alignment of the permanent belt support structure during the assembly of the permanent belt support structure.

We provide a method of installing permanent conveyor belt support after the conveyor belt has been advanced toward a forward tail piece by providing a safety guard unit which supports the conveyor belt in which a top belt is supported and a bottom return belt is substantially enclosed and supported, the safety guard unit forms a protected zone. The safety guard unit is supported by a cantilever support structure located at an end of the safety guard unit toward a forward tail piece in which most of the weight of the safety guard unit is supported by the cantilever support structure. Permanent conveyor belt supports are installed within the protected zone.

We also provide a method wherein the cantilever support structure includes a vertical member in which the top belt guard support is pivotally supported and the bottom belt guard support is pivotally supported. The top belt guard support and bottom belt guard support are supported vertically by an intermediate support that is positioned between the vertical member and the protected zone and having means compensating for floor undulations and changes in vertical belt positions.

The method also includes advancing the cantilever support structure to a next incremental position for permanent belt structure assembly.

The method also includes maintaining alignment of the permanent belt structure during assembly of the permanent belt structure.

DETAILED DESCRIPTION OF A PREFERRED A EMBODIMENT

Definitions

"Belt Guard Support" means a formed metal or non-metal sheet which, first, effectively confines a moving conveyor belt, thus reducing or eliminating the potential for contact between personnel and the moving conveyor belt, and second, provides physical support for the weight of the conveyor belt.

"Cantilevered Manner" means in the manner of a rigid lever, fixed at one end and supported by a fulcrum located between the fixed end and the free end of the lever such that the free end projects beyond the fulcrum.

"Cantilever Support Structure" means a rigid framework providing a fixed (pivoted) axis about which a lever ("guard support") can rotate and a fulcrum point or line which supports the lever such that the fulcrum is located between the fixed end and the free end of the lever.

"Leading End" means an end that is closest to the front end of the apparatus which advances toward a work face in the mine as opposed to the back end of the apparatus. For an example of the leading end see FIG. 5 no. 50 which is closest to the front end 54 as opposed to a trailing end 46.

"Primarily Supported" means the manner in which the fulcrum point or line carries the majority of the weight of a lever.

"Protected Zone" means working area where personnel are shielded by mechanical guards from contact with a moving conveyor belt.

"Intermediate Support" means a fulcrum point or line located between the two ends of a lever.

"Means Compensating" means a system of springs, bolts, and hydraulic pistons installed in a manner to provide adjustments to raise or lower the free end of the "belt guard support".

"Means for Maintaining Alignment" means an alignment anchor system that is used to prevent motion of the USAM.

"Next Incremental Position" means the unit length of the permanent conveyor belt structure being installed.

"Forward Tailpiece" means a roller used to reverse the direction of the conveyor belt generally located near the point where material is deposited on the conveyor belt.

"Trailing End" means an end that is located near the back end of the apparatus furthest away from the direction of advancement toward a work face in the mine that is opposite to the leading end. For an example of the trailing end see FIG. 5 no. 46 which is located near the back end 56 of the apparatus.

"Safety Guard Unit" means fixed metal or non-metal sheeting which separates the moving conveyor belt from personnel.

"Substantially Enclosed" means an envelope, open on each end, which surrounds the conveyor belt.

DESCRIPTION

Figure 1:
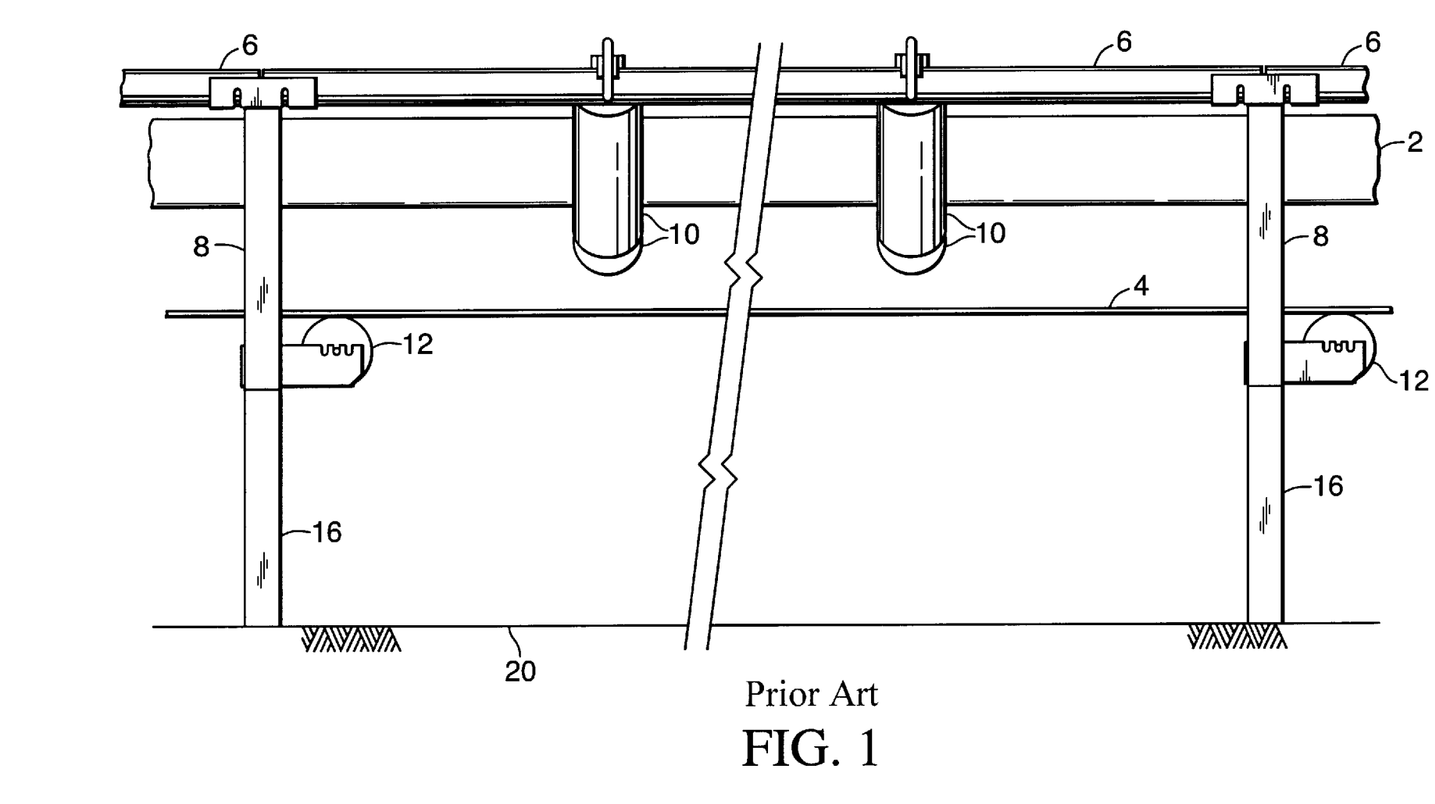
FIG. 1 A side view in elevation of a typical floor standing conveyor belt assembly.
Figure 2:
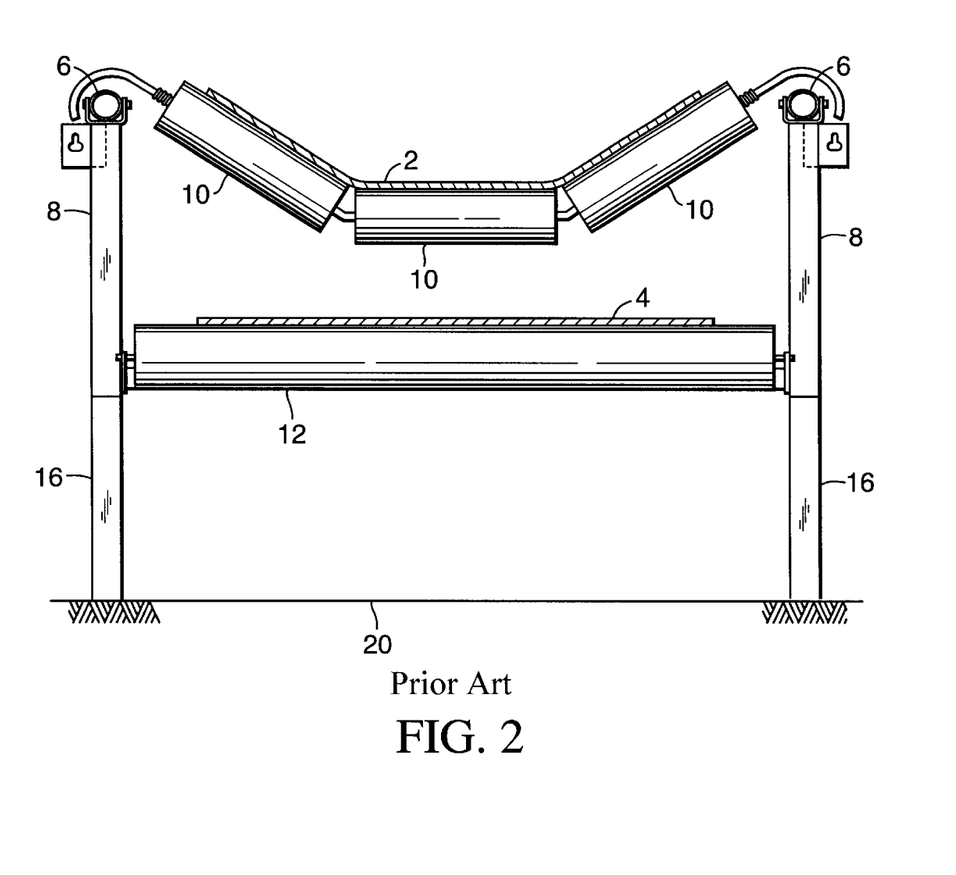
FIG. 2 An end view in elevation of a floor standing conveyor belt assembly.

FIGS. 1 and 2 show a typical floor standing conveyor belt system with a top belt 2 and a bottom belt 4 that are connected to form a single continuous loop. The loop is driven in a circular fashion and material to be conveyed is loaded on the top belt 2. At the end of the loop, the belt turns over forming the bottom belt 4 and the conveyed material falls off the belt . This loop is typically extended over a significant length (thousands of feet) and must be continuously supported. The conveyor belt support system consists of incremental, structural members which are hand assembled. A single section of belt structure typically includes a right and left side rail 6, a belt frame 8, a top roller 10, and a bottom roller 12. The belt frames are supported by floor legs 16 that stand on the floor 20.

Figure 3:
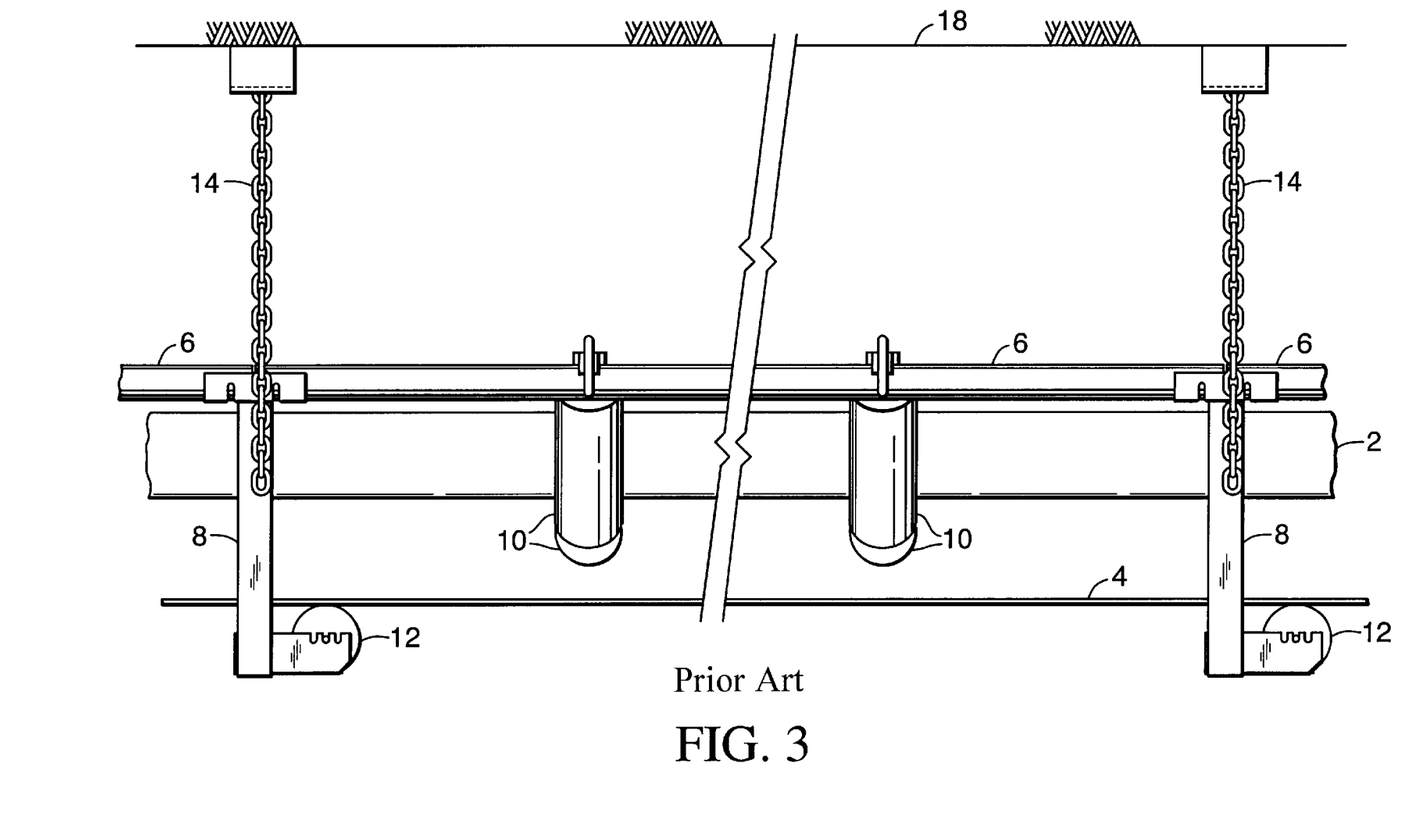
FIG. 3 A side view in elevation of a typical roof hung conveyor belt assembly.
Figure 4:
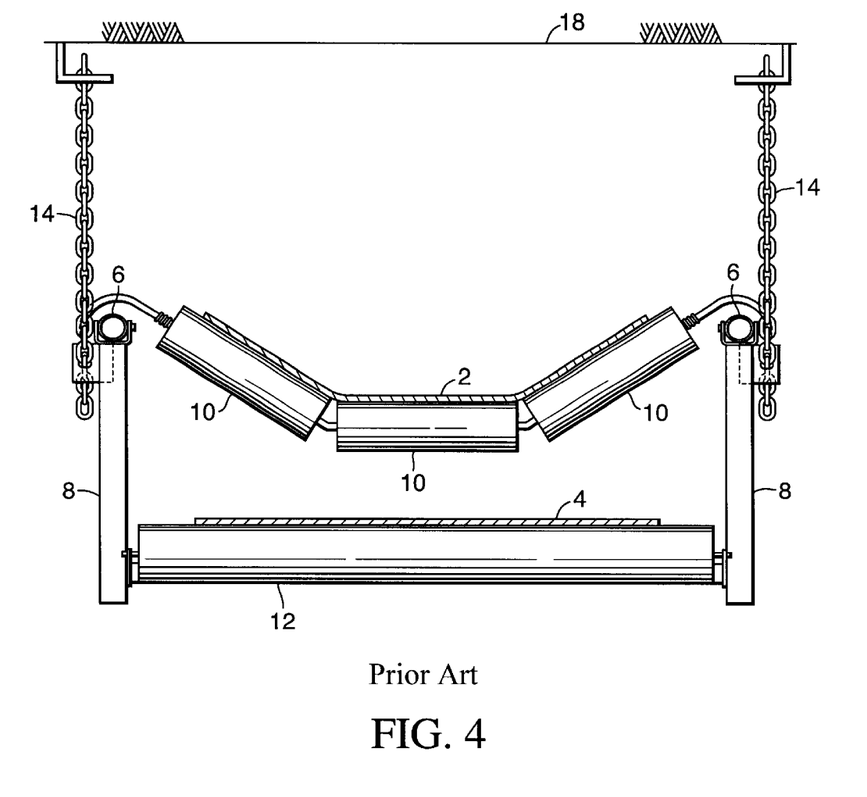
FIG. 4 An end view in elevation of a roof hung conveyor belt assembly.

FIGS. 3 and 4 show a typical roof hung conveyor belt system with a top belt 2 and a bottom belt 4 that are connected to form a single continuous loop. The loop is driven in a circular fashion and material to be conveyed is loaded on the top belt 2. At the end of the loop, the belt turns over forming the bottom belt 4 and the conveyed material falls off the belt. This loop is typically extended over a significant length (thousands of feet) and must be continuously supported. The conveyor belt support system consists of incremental, structural members which are hand assembled. A single section of belt structure typically includes a right and left side rail 6, a belt frame 8, a top roller 10, and a bottom roller 12. The belt frames are supported by chains 14 that are attached to the roof 18.

Figure 5:
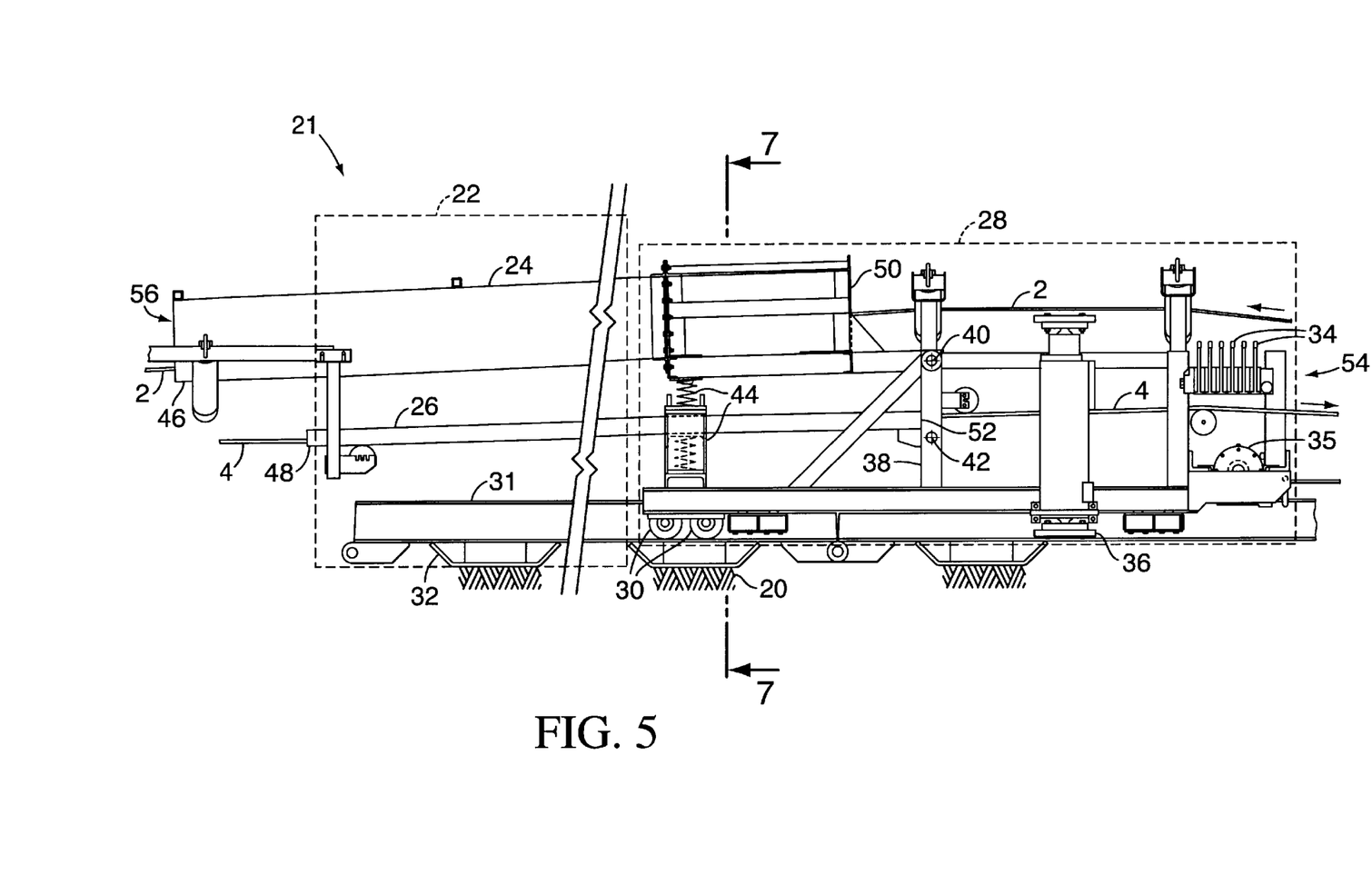
FIG. 5 A side view in elevation of the Universal Structure Assembly Module.

FIG. 5 shows the USAM 21 with a front end 54 and a back end 56. A top belt guard support 24 and a bottom belt guard support 26 separate the top belt 2 and bottom belt 4 from contact with the belt structure and workers which creates a protected zone 22 near the back end 56 of the USAM 21.

This protected zone 22 is typically large enough to accommodate one incremental section of permanent belt structure to be inserted. The top belt guard support 24 and the bottom belt guard support 26 are attached to a mobile frame 28. This mobile frame 28 can roll either on included wheels 30 that fit inside a track 31 of a separate sub-structure 32 or advance on rollers, tracks, or skids which come in direct contact with the floor 20. The sub-structure 32 is long enough to accommodate a desired length of total belt advancement. The USAM 21 also has onboard controls 34 for an advancement means 35 and an alignment anchor 36.

Because the protected zone 22 separates both the top belt 2 and the bottom belt 4 from contact with permanent belt support structure to be inserted and the workers, the conveyor belt system can be running while a section of permanent belt support structure is assembled. Once a section of permanent belt support structure is assembled, the onboard controls 34 are used to advance the USAM 21 a distance sufficient to permit installation of another section of permanent belt support structure. This process is repeated until the total desired length of permanent belt support structure has been added to the conveyor belt system.

A critical factor in conveyor belt support system installation is linear alignment of the conveyor belt on a longitudinal path. Before an extended length of permanent belt support can be added to the conveyor belt system utilizing the USAM 21, the sub-structure 32, when available, must be advanced and alignment maintained. To accomplish this, the alignment anchor 36 is set in place to prevent motion of the USAM 21. The sub-structure is advanced longitudinally through the USAM 21 alorig a desired straight line path while the transverse position of the sub-structure 32 is controlled due to a tight tolerance between the USAM 21 wheels 30 and the sub-structure 32. Because the sub-structure 32 is advanced on the desired longitudinal path, the USAM 21 is automatically aligned when it is advanced because it tracks on the sub-structure 32. This provides alignment of the permanent belt support structure installed with the USAM 21 and consequently the conveyor belt without additional adjustment.

The design of the top belt guard support 24 and the bottom belt guard support 26 permits adaptation to changing pitch and undulation of the floor. The top belt guard support 24 is mounted to a top belt guard support fixed pivot point 40 located on a vertical member 38. The top belt guard support 24 is supported near its leading end 50 by an intermediate support 44 to form a cantilever design. The top belt guard support 24 acts as a lever that is attached to a top belt guard support fixed pivot point 40 located on a vertical member 38 and is supported by the intermediate support 44 to make a cantilever support structure. The bottom belt guard support 26 is mounted to a bottom belt guard support fixed pivot point 42 located on a vertical member 38. The bottom belt guard support 26 is supported near its leading end 52 by an intermediate support 44 to form a cantilevered design. The bottom belt guard support 26 acts as a lever that is attached to the bottom belt guard support fixed pivot point 42 located on a vertical member 38 and is supported by the intermediate support 44 to make a cantilever support structure. This intermediate support 44 allows the height of a trailing end 46 of the top belt guard support 24 and a trailing end 48 of the bottom belt guard support 26 to change in response to changes in floor and belt geometry. Additionally, adjustment is provided for the intermediate support 44 to provide increased range of motion.

Figure 6:
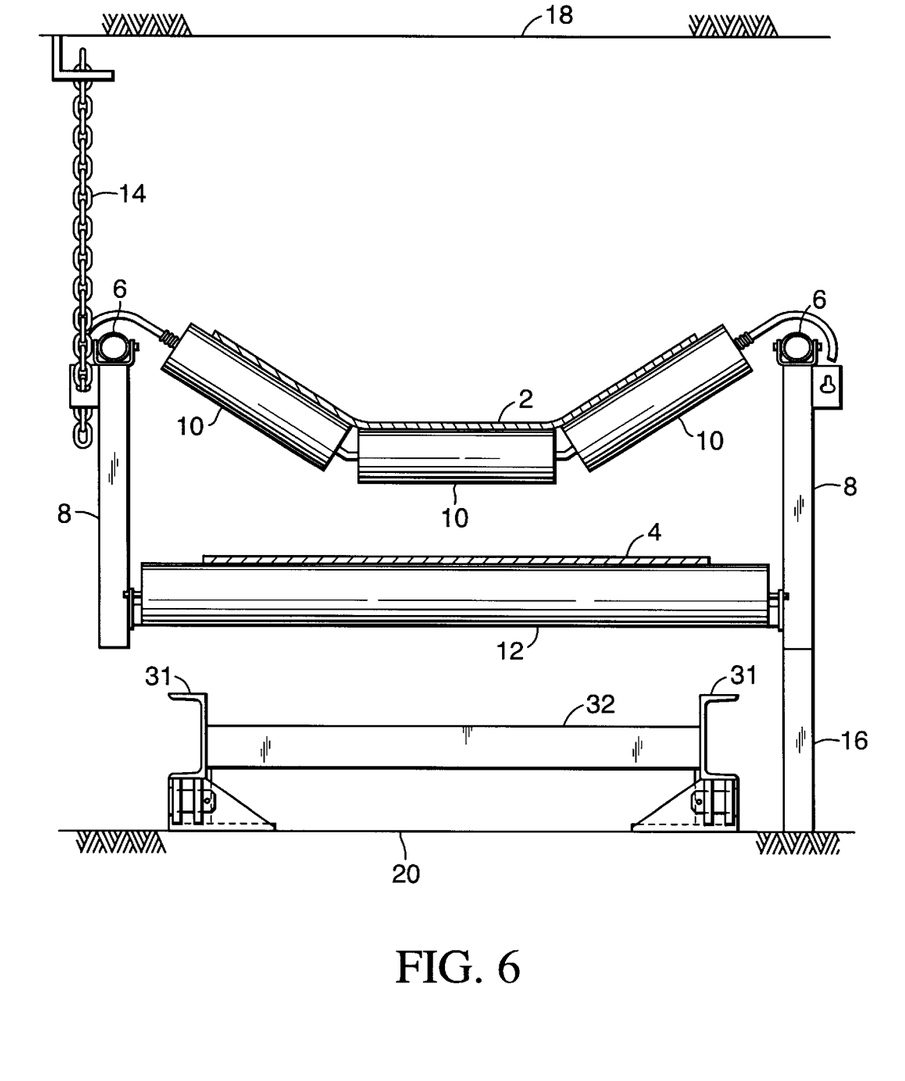
FIG. 6 An end view in elevation of a roof hung/floor standing conveyor belt with a track for the Universal Structure Assembly Module.

FIG. 6 shows the separate sub structure 32 with the track 31 relative to a composite of both a typical roof hung conveyor belt and a typical floor standing conveyor belt.

Figure 7:
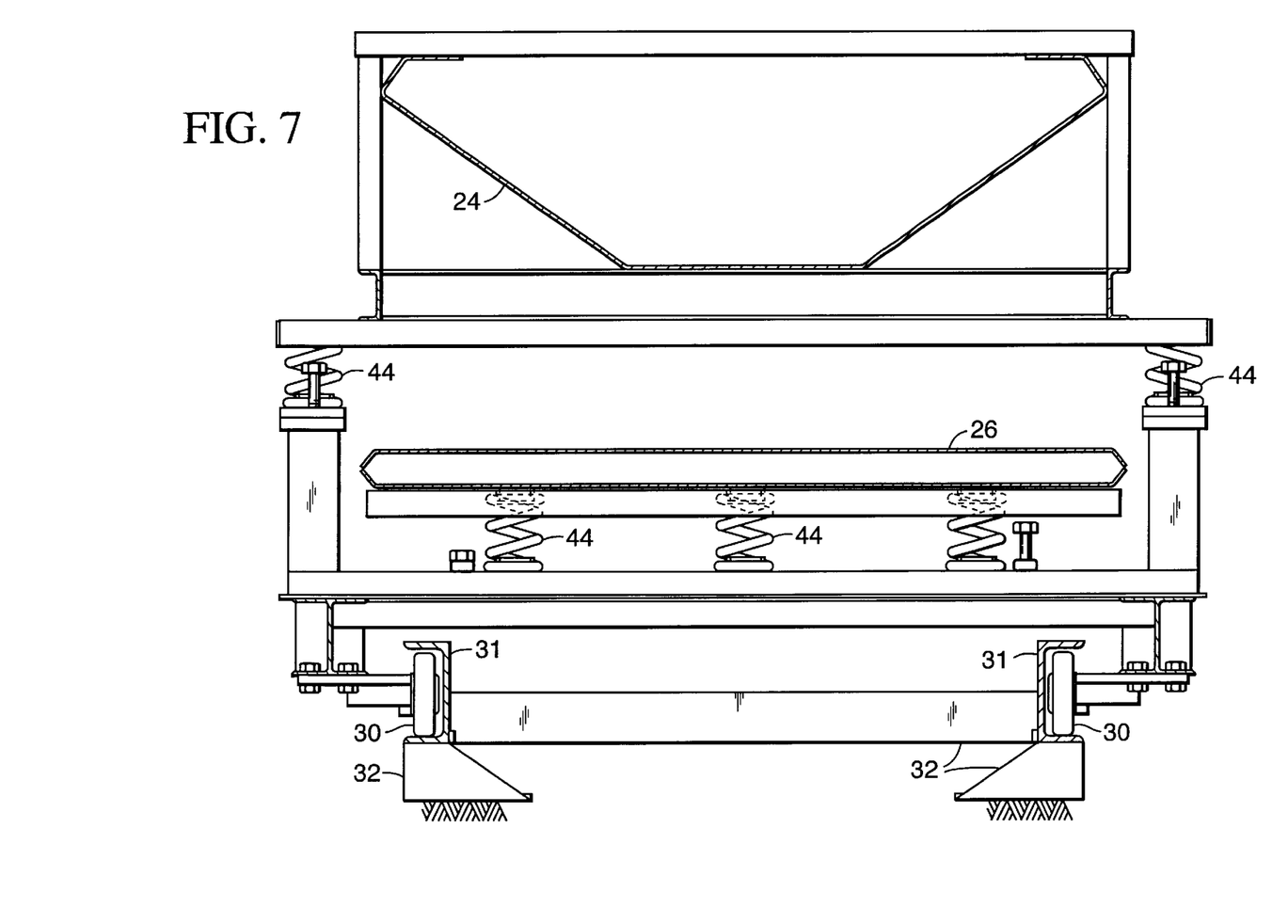
FIG. 7 A cross sectional view of FIG. 5 along the line 7—7.

FIG. 7 shows a the top belt guard support 24 and the bottom belt guard support 26 supported by the intermediate support 44. The wheels 30 of the USAM 21 are in the track 31 of the separate sub structure 32.

We claim:

1. An apparatus for providing temporary support to an operating conveyor belt which comprises:

(a) a top belt guard support having a leading end;

(b) a bottom belt guard support having a leading end;

(c) a cantilever support structure connected to the leading ends of the top belt guard support and the bottom belt guard support in which the top belt guard support is primarily supported in a cantilevered manner and the bottom belt guard support is primarily supported in a cantilevered manner; and (d) a protected zone formed within a linear distance determined by a length of the top and bottom belt guard supports which enable installation of different types of permanent supports while the conveyor belt is operating and within protection of the belt guard supports.

2. An apparatus as recited in claim 1 wherein the cantilever support structure includes:

(a) a vertical member on which the top belt guard support is pivotally supported and the bottom belt guard is pivotally supported; and (b) an intermediate support in which the top belt guard support and bottom belt guard support are supported vertically, the intermediate support is positioned between the vertical member and the protected zone and having means compensating for floor undulations and changes in vertical belt positions.

3. An apparatus as recited in claim 1 in which the cantilever support structure has a means to advance the cantilever support structure to a next incremental position for permanent belt structure assembly.

4. An apparatus as recited in claim 3 including a means for maintaining alignment of the permanent belt support structure during assembly of the permanent belt support structure.

5. A method of installing permanent conveyor belt support after a conveyor belt has been advanced toward a forward tail piece comprising:

(a) providing a safety guard unit which supports the conveyor belt in which a top belt is supported and a bottom return belt is substantially enclosed and supported, the safety guard unit forms a protected zone;

(b) supporting the safety guard unit by a cantilever support structure located at an end of the safety guard unit toward a forward tail piece in which most of the weight of the safety guard unit is supported by the cantilever support structure and most of the weight of the top belt in the protected zone is supported by the cantilever support and most of the weight of the return belt in the protected zone is supported by the cantilever support; and (c) installing permanent conveyor belt supports within the protected zone.

6. A method as recited in claim 5 wherein the cantilever support structure includes:
   (a) a vertical member in which the top belt guard support is pivotally supported and the bottom belt guard support is pivotally supported; and
   (b) an intermediate support in which the top belt guard support and bottom belt guard support are supported vertically, the intermediate support is positioned between the vertical member and the protected zone and having means compensating for floor undulations and changes in vertical belt positions.

7. A method as recited in claim 5 including advancing the cantilever support structure to a next incremental position for permanent belt structure assembly.

8. A method as recited in claim 7 including maintaining alignment of the permanent belt structure during assembly of the permanent belt structure.

* * * * *

UNITED STATES PATENT AND TRADEMARK OFFICE
CERTIFICATE OF CORRECTION

PATENT NO.    : 6,659,269 B1
DATED         : December 9, 2003
INVENTOR(S)   : Roberts et al.

It is certified that error appears in the above-identified patent and that said Letters Patent is hereby corrected as shown below:

<u>Title page,</u>
Item [56], References Cited, U.S. PATENT DOCUMENTS, cancel "4,959,691 A * 9/1990 Satoh" and insert -- 4,959,691 A * 11/1990 Moore --

<u>Column 4,</u>
Line 41, cancel "falls off the belt ." and insert -- falls off the belt. --

Signed and Sealed this

Twenty-seventh Day of April, 2004

JON W. DUDAS
*Acting Director of the United States Patent and Trademark Office*